United States Patent [19]

Stoller

[11] 3,988,519

[45] Oct. 26, 1976

[54] LAMINATES OF A POLYMERIC FILM AND A NONWOVEN FABRIC

[75] Inventor: Frederick L. Stoller, Greenville, S.C.

[73] Assignee: Phillips Petroleum Company, Bartlesville, Okla.

[22] Filed: Jan. 13, 1975

[21] Appl. No.: 540,563

[52] U.S. Cl. ............................... 428/15; 428/332; 428/337; 428/339; 428/340; 428/401; 428/904; 428/224
[51] Int. Cl.² ...................... B32B 27/12; B44F 9/12
[58] Field of Search ............ 161/88, 151, 247, 252; 117/138.8 D, 138.8 PV, 76 F; 428/286, 290, 15, 224, 473, 904, 332, 357, 339, 401, 340

[56] References Cited
UNITED STATES PATENTS

| | | | |
|---|---|---|---|
| 2,537,126 | 1/1951 | Francis | 161/151 |
| 2,875,115 | 2/1959 | Lott et al. | 161/151 |
| 2,949,394 | 8/1960 | Rodman | 161/151 |
| 3,282,771 | 11/1966 | Goodman et al. | 161/151 |
| 3,414,625 | 10/1969 | Draper et al. | 61/1 |
| 3,664,909 | 5/1972 | Ackley | 161/141 |
| 3,666,585 | 5/1972 | Barbehenn | 156/85 |
| 3,759,776 | 9/1973 | Decker | 161/88 |
| 3,834,978 | 9/1974 | Nisenson et al. | 161/88 |

OTHER PUBLICATIONS

*Reinhold Plastics Applications* Series, "Polyvinyl Chloride" Sarvetnick, Van Nostrand Reinhold Co., pp. 246, 247 appendix.
*PVC Technology*, W. S. Penn B. Sc. Chapter 24, "Compounding of PVC Pastes" pp. 316–319.
*Laminator/Embosser Systems*, Lembo Corp., 235 McLean Boulevard, Patterson, NJ.
*Modern Plastics* 51, "Calendering Today Isn't Just Vinyls", June 1974, pp. 61–63.

Primary Examiner—Harold Ansher
Assistant Examiner—P. J. Thibodeau

[57] ABSTRACT

A polymeric film and a nonwoven fabric of drawn synthetic fibers are bonded together to produce a laminate which is useful as upholstering material.

10 Claims, No Drawings

LAMINATES OF A POLYMERIC FILM AND A NONWOVEN FABRIC

BACKGROUND OF THE INVENTION

The invention relates to a laminate.

Bonded materials comprising a polymeric film bonded to a nonwoven substrate are known in the art. A U.S. Pat. issued to Goodman et al, 3,282,771 (1966), discloses a laminate which is useful for floor coverings. The laminate is made by bonding a film of calendered polyvinyl chloride to a relatively heavy fibrous web. It is an object of the patent to produce a floor covering from fibrous webs which combine resilience, abrasion resistance, recovery from deformation and low noise generation. However, as with most textiles, a number of parameters must be satisfied before a product suitable for a particular end use is produced. For example, the patent discloses that the thickness of the polyvinyl chloride film, the weight percent of the film in the laminate and the degree of orientation of the fibers in the web are all important. Further, the patent discloses that probably the most important parameter is the density of the fibrous web.

Aslo, it is known in the art to bond polymeric films, such as polyvinyl chloride, to woven or knitted fabrics to produce laminates. These laminates have a soft leather-like hand and are useful as upholstery materials. Laminates made with knitted fabrics in particular have been used extensively as upholstery materials.

Thus, it is surprising that applicant discovered a laminate, comprising essentially the same basic materials as those previously used to produce floor coverings, which possesses better overall properties desirable in materials useful as upholstery materials than those of known comparable materials. The laminates of the invention possess an equal or better leather-like hand than polymeric films bonded to woven or knitted fabrics. Also the inventive laminates possess better tear strength and ultimate strength than comparable materials known in the art. The discovery is surprising particularly when one considers that such qualities as a soft leather-like hand and suppleness are essential in an upholstery material, but such qualities are of no importance or even detrimental in a floor covering.

It is an object of the invention to provide a laminate.

Another object of the invention is to provide a laminate comprising a polymeric film bonded to a nonwoven fabric.

Yet another object of the invention is to provide a laminate comprising a polymeric film and a nonwoven fabric which possesses soft leather-like qualities such as suppleness, soft hand, good tear strength and good grab strength.

Other objects, aspects and advantages of the invention will be apparent to one skilled in the art after studying the specification and appendant claims.

SUMMARY OF THE INVENTION

According to the invention, a polymeric film selected from the group consisting of polyvinyl chloride, polyurethane and combinations thereof having a thickness in the range of from about 6 to about 20 mils and a nonwoven fabric of drawn synthetic fibers having a weight in the range of from about 0.8 to about 7 oz./yd.$^2$ and a density in the range of from about 3 to about 20 lbs./ft.$^3$ are bonded together to produce a laminate in which the film comprises from about 50 to about 90 weight percent of the laminate.

DETAILED DESCRIPTION OF THE INVENTION

It is important in understanding the invention that one fully realizes that a very soft and supple laminate is desired with a hand similar to that of soft leather. In addition, the combination of the polymeric film and the nonwoven fabric of the invention produces a laminate which has a much better hand, tear strength and grab strength than the polymeric film alone. Further, generally speaking, the inventive laminate has a hand better than the leather-like laminates known in the art as well as better tear strength and better grab strength. Improved tear strength and grab strength are important, particularly in uses such as upholstery, for example, to reduce the tendency of buttons to pull through the laminate.

The nonwoven fabric can be made of drawn continuous filaments or staple. As is well known in the art, drawing of synthetic fibers, whether used as continuous filaments or staple, is necessary before the fibers possess sufficient strength for processing and use. If continuous filaments are used to produce the fabric, the filaments must be bonded together by some means, such as by fusing one or both sides of the batt used to product the fabric. Needling a batt of continuous filaments without fusing at least one side of the batt does not produce a satisfactory substrate for purposes of the invention. In addition, fusing one or both sides of the batt substantially increases the stiffness of the fabric and the ultimate laminate made therefrom.

A nonwoven batt of staple, however, can be bonded together simply by needling which results in a soft, strong, flexible nonwoven fabric. A nonwoven batt of staple also can be bonded by fusing the batt on one or both sides and/or by needling the batt to produce a nonwoven fabric suitable for use in the invention; but fusing the fabric of staple increases the stiffness and reduces the softness of the fabric. Thus, the unfused, needled, nonwoven fabric of staple is preferred.

The production of a nonwoven fabric of staple or continuous filaments is well known in the art. One of the better known methods of producing a nonwoven fabric of staple employs the use of warp threads which help to maintain the integrity of the batt prior to and during the bonding step, such as needling. Another method for producing a nonwoven fabric of staple fibers employs a drafting zone to draw the batt in the warp direction prior to needling which eliminates the need for warp threads. The presence of warp threads in the batt sometimes is apparent from the polymeric film side of the laminate and thus the laminate made with the warpless fabric generally is more desirable.

Synthetic fibers useful in the production of the nonwoven fabric vary widely. Some examples of suitable fibers include polypropylene, rayon polyester, acrylonitrile, nylon, polyphenylene sulfide and mixtures thereof. The denier of the fibers generally ranges from about 1 to about 20 although fibers with a denier in the range of from about 2 to 15 are used more often. Also it is noted that suitable fabrics can be produced containing more than a single denier.

As previously stated, the use of staple fibers rather than continuous filaments to form the nonwoven fabric is preferred. Surprisingly, it has been found that staple length is critical in the production of the nonwoven fabric. It has been shown that staple having a length in the range of from about 2 to about 7 inches produces a much stronger laminate than shorter staple. Generally, it has been found that staple with a length in the range of from about 3 to about 6 inches produces a very strong needled, unfused fabric. The values for tear resistance and grab strength in the tests hereinafter discussed evidence the criticality of staple length.

A further important parameter of the present invention is the weight of the nonwoven fabric. Generally, the weight is in the range of from about 0.8 to about 7 oz./yd.$^2$, but a better comprise of both cost and strength is a weight in the range of from about 2 to about 6 oz./yd.$^2$. If the fabric is too light, then the laminate will tear easily and possess poor grab strength; however, if the nonwoven fabric is too heavy or too stiff, then the laminate will have poor hand and less suppleness.

Another control on the fabric of the invention is the density of the nonwoven fabric. Although density and weight of the nonwoven fabric are directly related for a given thickness of a given nonwoven fabric, both of the parameters must be identified to fully describe the nonwoven fabric. The density of the nonwoven fabric generally is in the range of from about 3 to about 20 lbs./ft.$^3$, but again a better compromise between cost and strength is a density in the range of from about 3 to about 14 lbs./ft.$^3$.

The polymeric film which is suitable for use in the invention generally is three types, polyvinyl chloride, polyurethane and combinations of these two materials. Polyurethane usually produces a glossier finish than does polyvinyl chloride; and, in instances where both polymers are used, generally the polyvinyl chloride is next to the nonwoven fabric and the polyurethane is on top of the polyvinyl chloride which improves the glossiness of the laminate. Polyvinyl chloride is the preferred polymeric film since its appearance is good and polyvinyl chloride normally is cheaper than polyurethane.

A range of thicknesses of the polymeric film can be used; of course, only one thickness within reasonable limits is used to make a uniform laminate. Generally, the film thickness is in the range of from about 6 to 20 mils; however, good results have been produced in which the film thickness is more nearly within the range of from about 8 to about 15 mils.

As a general rule, the laminates of the invention comprise in the range of from about 50 to about 90 weight percent polymeric film. It has been found that laminates comprising less than about 50 percent polymeric film or more than about 90 percent polymeric film suffer in one or more properties characteristic of the laminate of the invention. For example, laminates comprising less than about 50 percent polymeric film frequently show irregularities of the backing through the film and are deficient in resistance to cutting, tearing and puncturing. Laminates comprising more than about 90 percent polymeric film generally are deficient in tear strength and grab strength as compared to the inventive laminate, and they have less leather-like hand than laminates of the invention.

The laminates of the invention are manufactured by employing one of a number of well-known processes, such as direct calender lamination, post lamination and transfer coating.

Direct calender lamination produces a very good laminate without the use of adhesives. The polymeric film acts as the adhesive because it is contacted with the nonwoven fabric shortly after extrusion and thus while the film is still hot and sticky.

Post lamination is another well developed method and differs from the direct calender lamination technique in that the polymeric film is not usually extruded just prior to the bonding step and an adhesive is applied to the polymeric film before the film is contacted with the nonwoven fabric. A roll of polymeric film is generally the source of the film, and a thin layer of adhesive is applied to the side of the film which is to be bonded to the nonwoven fabric. The adhesive is applied by a suitable means usually in an amount in the range of from about 1 to about 5 oz./yd.$^2$ depending upon the adhesive. The coated film then is contacted with the nonwoven fabric thereby producing a good, strong, leather-like fabric.

Adhesives suitable for use in the post lamination technique are well known in the art. Plastisols are one of the best known materials. These are dispersions of finely divided polymeric materials in nonvolatile organic liquids and low melting solids, generally referred to as plasticizers. Suitable plasticizers include phthalate, adipate and sebaccate esters and polyols such as ethylene glycol and its derivatives. A typical plastisol composition is 100 parts polymeric material and 50 parts plasticizer, forming a paste which gels when heated to about 300° F as a result of solvation of the resin particles by the plasticizer. If a volatile solvent is included in the plastisol, then the adhesive generally is referred to as an organosol which also is suitable for use in the invention.

The transfer coating method is most often used when a blowing agent is incorporated into the polymeric film thereby ultimately producing an expanded laminate. In some instances it has been found that the temperatures which activate the blowing agent may be too high for use of some of the materials otherwise useful in the invention to produce the nonwoven fabric. For example, a nonwoven fabric of polypropylene staple may shrink excessively at temperatures normally required to activate a blowing agent in a film of polyvinyl chloride.

The laminate of the invention possesses qualities which make it particularly well suited for use as upholstery material to provide a relatively inexpensive leather-like material which has good tear strength and grab strength.

The following examples illustrate typical laminates of the invention.

EXAMPLE I

A freshly extruded sheet of polyvinyl chloride 12 mils thick was bonded to a nonwoven fabric employing the direct calender lamination process. The nonwoven fabric comprised drawn three denier per filament polypropylene staple four inches long weighing 3.3 oz./yd.$^2$. The nonwoven fabric also contained 4 threads per inch of polyester 30 cotton count warp thread. The nonwoven fabric was fused on one side only with the unfused side of the nonwoven fabric contacting the film. The laminate weighed 12 oz./yd.$^2$ and had the following properties:

TABLE I

| Test | Direction | Results |
|---|---|---|
| Grab Strength[1] | Warp | 95 lbs. |
| | Fill | 105 lbs. |
| Burst Strength[2] | | >200 lbs./in.$^2$ (off scale) |
| Bond Strength | | 10 lbs./in. |

TABLE I-continued

| Test | Direction | Results |
|---|---|---|
| (film to fabric) | | |

[1]ASTM-D1682-64
[2]ASTM-D2262-64D

EXAMPLE II

Employing the post lamination method a polyvinyl chloride sheet 10 mils thick was coated on one side at a rate of 4 oz./yd$^2$ with a polyvinyl chloride plastisol bonding agent comprising polyvinyl chloride in dioctyl phthalate. The coated sheet of polyvinyl chloride was bonded to a nonwoven polypropylene staple fabric weighing 2.5 oz./yd.$^2$. The nonwoven fabric contained drawn three denier per filament staple approximately four inches long and was fused on both sides. Also, the nonwoven fabric contained warp threads just as the fabric of Example I. The resultant laminate weighed 11 oz./yd.$^2$ and had the following properties:

TABLE II

| Test | Direction | Results |
|---|---|---|
| Grab Strength[3] | Warp | 78 lbs. |
| | Fill | 85 lbs. |
| Tear Strength[4] | Warp | 32 lbs. |
| | Fill | 37 lbs. |
| Bond Strength | | 1–2 lbs./in. |

[3]ASTM-D1682-64
[4]ASTM-D2261-71

Examples I and II show the operability of the invention using either the direct calender lamination process of the post lamination process. In both examples the laminates had good hand and suppleness, much the same as soft leather. The laminate of Example I was the better laminate because of the better bond strength. Bond strength of the laminate of Example II easily could be improved by using a nonwoven fabric which is needled and unfused or fused only on one side.

The following example illustrates the criticality of staple length regarding the strength of nonwoven fabrics used in laminates of the invention.

EXAMPLE III

Two nonwoven fabric samples were prepared from three denier per filament drawn polypropylene staple. Both samples were bonded by needling and were identical in all respects except for stable length. One sample contained 2½-inch staple and the other 4-inch staple.

TABLE III

| | | 2½" Staple | 4" Staple |
|---|---|---|---|
| Grab Test[5] | | | |
| Sample weight | oz./yd.$^2$ | | |
| | Warp | 4.19 | 4.19 |
| | Fill | 4.19 | 4.19 |
| Elongation at | 10 lbs., % | | |
| | Warp | 60.8 | 50.6 |
| | Fill | 56.9 | 43.4 |
| Elongation at | break, % | | |
| | Warp | 115.3 | 127.3 |
| | Fill | 116.8 | 125.1 |
| Grab Strength, | lbs. | | |
| | Warp | 68.6 | 105.2 |
| | Fill | 101.4 | 151.2 |
| Tear Test[6] | | | |
| Sample Weight, | oz./yd.$^2$ | | |
| | Warp | 4.20 | 4.22 |
| | Fill | 4.22 | 4.22 |
| Tear Strength, | lbs. | | |
| | Warp | 32.0 | 47.1 |
| | Fill | 37.1 | 61.3 |

[5]ASTM 1682-64
[6]ASTM 2261-71

The above results show that the nonwoven fabric made with 4-inch staple is considerably stronger in both grab strength and tear strength than the fabric made with 2½-inch staple. Although the laminate of the invention could be made with either nonwoven fabric, and each laminate would possess a similar hand, the laminate produced using the nonwoven fabric with 4-inch staple would be stronger, and in general would be the much better product.

What is claimed is:
1. A leather-like laminate comprising:
   a polymeric film selected from the group consisting of polyvinyl chloride, polyurethane and combinations thereof having a thickness in the range of from about 6 to about 20 mils; and
   a nonwoven fabric of drawn synthetic staple fibers, said fabric having a weight in the range of from about 0.8 to about 7 oz./yd.$^2$ and a density in the range of from about 3 to about 14 lbs./ft.$^3$ and being formed by needling a batt of staple fibers having a length in the range of from about 2 to about 7 inches
   wherein said film and said fabric are bonded together to form said laminate; and
   wherein said polymeric film comprises at least 50 to about 90 weight percent of said laminate.
2. The laminate of claim 1 wherein the polymeric film has a thickness in the range of from about 8 to about 15 mils and the nonwoven fabric has a weight in the range of from about 2 to about 6 oz./yd.$^2$.
3. The laminate of claim 1 wherein the fibers of the nonwoven fabric are selected from the group consisting of polypropylene, rayon, polyester, acrylonitrile, nylon, polyphenylene sulfide, and mixtures thereof.
4. The laminate of claim 1 wherein the polymeric film is polyvinyl chloride and the fibers of the nonwoven fabric are polypropylene.
5. The laminate of claim 4 wherein the polypropylene fibers have a denier per filament in the range of from about 1 to about 20.
6. The laminate of claim 4 wherein the polypropylene fibers are staple having a length in the range of from about 3 to about 6 inches long and a denier per filament in the range of from about 2 to about 15.
7. The laminate of claim 5 wherein the nonwoven fabric is made without warp threads.
8. The laminate of claim 1 wherein the bonding is accomplished by direct calender lamination.
9. The laminate of claim 1 including an adhesive wherein the bonding is accomplished by post lamination.
10. The laminate of claim 5 wherein the nonwoven fabric is unfused, needled staple, the staple of the nonwoven fabric is bonded only by needling, and the nonwoven fabric is made without warp threads.

* * * * *

Disclaimer and Dedication 3,988,519.—*Frederick L. Stoller*, Greenville S.C. LAMINATES OF A POLYMERIC FILM AND A NONWOVEN FABRIC. Patent dated Oct. 26, 1976. Disclaimer and Dedication filed May 13, 1980, by the assignee, *Phillips Petroleum Company*.

Hereby disclaims and dedicates to the Public the remaining term of said patent.

[*Official Gazette June 24, 1980.*]